(12) United States Patent
Palka et al.

(10) Patent No.: US 9,804,206 B2
(45) Date of Patent: Oct. 31, 2017

(54) METHOD AND A DEVICE FOR MEASURING PARAMETERS OF AN ANALOG SIGNAL

(71) Applicant: UNIWERSYTET JAGIELLONSKI, Cracow (PL)

(72) Inventors: Marek Palka, Cracow (PL); Pawel Moskal, Czulowek (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 0 days.

(21) Appl. No.: 14/915,268

(22) PCT Filed: Aug. 29, 2014

(86) PCT No.: PCT/EP2014/068367
§ 371 (c)(1),
(2) Date: Feb. 29, 2016

(87) PCT Pub. No.: WO2015/028600
PCT Pub. Date: Mar. 5, 2015

(65) Prior Publication Data
US 2016/0209449 A1 Jul. 21, 2016

(30) Foreign Application Priority Data
Aug. 30, 2013 (PL) .......................................... 405182

(51) Int. Cl.
*G01R 19/00* (2006.01)
*G01R 19/175* (2006.01)
(Continued)

(52) U.S. Cl.
CPC .......... *G01R 19/175* (2013.01); *G01T 1/2985* (2013.01); *G04F 10/005* (2013.01);
(Continued)

(58) Field of Classification Search
CPC ....... H01L 21/00; H01L 2221/00; G06F 1/00; G06F 2101/00
See application file for complete search history.

(56) References Cited

U.S. PATENT DOCUMENTS

| 4,916,329 A * | 4/1990 | Dang ........................ G05F 1/24 307/66 |
| 2010/0085087 A1* | 4/2010 | Dash ................ G01R 31/31721 327/143 |

(Continued)

*Primary Examiner* — Jermele M Hollington
*Assistant Examiner* — Temilade Rhodes-Vivour
(74) *Attorney, Agent, or Firm* — Mark M. Friedman

(57) ABSTRACT

A method for measuring parameters of an analog signal to determine times at which the analog signal (S) crosses predetermined voltage thresholds ($V_A$, $V_B$, $V_C$, $V_D$), the method comprising the steps of: splitting the analog signal (S) into a number of interim signals ($S_A$, $S_B$, $S_C$, $S_D$), the number of the interim signals corresponding to the number of the preset voltage thresholds ($V_A$, $V_B$, $V_C$, $V_D$); providing an FPGA system (10) comprising differential buffers (11 A, 11 B, 11 C, 11 D) with outputs connected to a number of sequences (20A, 20B, 20C, 20D) of delay elements (21, 22, 23), the number of sequences of delay elements corresponding to the number of the preset voltage thresholds ($V_A$, $V_B$, $V_C$, $V_D$); inputting, to an input of each differential buffer (11 A, 11 B, 11 C, 11 D), one interim signal ($S_A$, $S_B$, $S_C$, $S_D$) and a reference voltage corresponding to a particular preset voltage threshold ($V_A$, $V_B$, $V_C$, $V_D$); reading, by means of vector generators (31 A, 31 B, 31 C, 31 D), assigned separately to each of the sequences (20A, 20B, 20C, 20D) and connected to a common clock signal (CLK), current values of output signals of each of the delay elements (21, 22, 23) in the particular sequence (20A, 20B, 20C, 20D) at the same moment for all vector generators and providing these values as sequence output vectors ($W_A$, $W_B$, $W_C$, $W_D$); and determining times at which the analog signal (S) crosses the predetermined voltage thresholds ($V_A$, $V_B$, $V_C$, $V_D$) on (Continued)

the basis of the values of the sequence output vectors ($W_A$, $W_B$, $W_C$, $W_D$) and the delays introduced by the delay elements (21, 22, 23).

6 Claims, 2 Drawing Sheets

(51) Int. Cl.
 *G04F 10/00* (2006.01)
 *G01T 1/29* (2006.01)
 *H01L 21/00* (2006.01)
 *G06F 1/00* (2006.01)

(52) U.S. Cl.
 CPC ............ *G06F 1/00* (2013.01); *G06F 2101/00* (2013.01); *H01L 21/00* (2013.01)

(56) References Cited

U.S. PATENT DOCUMENTS

| | | | |
|---|---|---|---|
| 2011/0098980 A1* | 4/2011 | Ouvrier-Buffet | G01T 1/171 702/189 |
| 2012/0104268 A1* | 5/2012 | Burr | G01T 1/2985 250/370.09 |
| 2012/0268105 A1* | 10/2012 | Mann | G01T 1/17 324/120 |
| 2013/0127441 A1* | 5/2013 | Tseng | G01R 19/16552 324/76.11 |

* cited by examiner

METHOD AND A DEVICE FOR MEASURING PARAMETERS OF AN ANALOG SIGNAL

TECHNICAL FIELD

The disclosure relates to a method and a device for measuring parameters of an analog signal. The field of application includes particularly the measurement of electric signals delivered from converters in TOF-PET scanners where high accuracy of time measurements is required.

BACKGROUND

Images of the interiors of bodies may be acquired using various types of tomographic techniques, which involve recording and measuring radiation from tissues and processing acquired data into images.

One of these tomographic techniques is positron emission tomography (PET), which involves determining spatial distribution of a selected substance throughout the body and facilitates detection of changes in the concentration of that substance over time, thus allowing to determine the metabolic rates in tissue cells.

The selected substance is a radiopharmaceutical administered to the examined object (e.g. a patient) before the PET scan. The radiopharmaceutical, also referred to as an isotopic tracer, is a chemical substance having at least one atom replaced by a radioactive isotope, e.g. $^{11}C$, $^{15}O$, $^{13}N$, $^{18}F$, selected so that it undergoes radioactive decay including the emission of a positron (antielectron). The positron is emitted from the atom nucleus and penetrates into the object's tissue, where it is annihilated in reaction with an electron present within the object's body.

The phenomenon of positron and electron annihilation, constituting the principle of PET imaging, consists in converting the masses of both particles into energy emitted as annihilation photons, each having the energy of 511 keV. A single annihilation event usually leads to formation of two photons that diverge in opposite directions at the angle of 180° in accordance with the law of conservation of the momentum within the electron-positron pair's rest frame, with the straight line of photon emission being referred to as the line of response (LOR). The stream of photons generated in the above process is referred to as gamma radiation and each photon is referred to as gamma quantum to highlight the nuclear origin of this radiation. The gamma quanta are capable of penetrating matter, including tissues of living organisms, facilitating their detection at certain distance from object's body. The process of annihilation of the positron-electron pair usually occurs at a distance of several millimeters from the place of the radioactive decay of the isotopic tracer. This distance constitutes a natural limitation of the spatial resolution of PET images to a few millimeters.

A PET scanner comprises detection devices used to detect gamma radiation as well as electronic hardware and software allowing to determine the position of the positron-electron pair annihilation event on the basis of the position and time of detection of a particular pair of the gamma quanta. The radiation detectors are usually arranged in layers forming a ring around object's body and are mainly made of an inorganic scintillation material. A gamma quantum enters the scintillator, which absorbs its energy to re-emit it in the form of light (a stream of photons). The mechanism of gamma quantum energy absorption within the scintillator may be of dual nature, occurring either by means of the Compton's effect or by means of the photoelectric phenomenon, with only the photoelectric phenomenon being taken into account in calculations carried out by current PET scanners. Thus, it is assumed that the number of photons generated in the scintillator material is proportional to the energy of gamma quanta deposited within the scintillator.

When two annihilation gamma quanta are detected by a pair of detectors at a time interval not larger than several nanoseconds, i.e. in coincidence, the position of annihilation position along the line of response may be determined, i.e. along the line connecting the detector centers or the positions within the scintillator strips where the energy of the gamma quanta was deposited. The coordinates of annihilation place are obtained from the difference in times of arrival of two gamma quanta to the detectors located at both ends of the LOR. In the prior art literature, this technique is referred to as the time of flight (TOF) technique and the PET scanners utilizing time measurements are referred to as TOF-PET scanners. This technique requires that the scintillator has a time resolution of a few hundred picoseconds.

Light pulses reaching the scintillator can be converted into electric pulses by means of photomultipliers or photodiodes. Electric signals from the converters carry information on positions and times of the annihilation quanta subject to detection, as well as on the energy deposited by these quanta.

The principal elements of the signal processing system within the radiation detectors are leading edge discriminators and constant fraction discriminators. These elements, combined with time-to-digital converters, facilitate the measurement of time at which the electric signals generated at these detectors exceed a preset reference voltage or a preset signal amplitude fraction, respectively. Said discriminators are built on the basis of standard electronic components and include, among other components, a current source, a preamplifier, a comparator, a shaper, capacitors, resistors, diodes, transistors and transmission lines. If the detector signal is higher than the threshold voltage set at the discriminator, a logical signal is generated at the discriminator output, carrying information on the time at which the gamma quantum was recorded. The charge is measured by means of analog-to-digital converters.

Temporal resolutions of leading edge and constant fraction discriminators are limited by the dependence of the discriminator response on the shape of signals and, in case of leading edge discriminators, also on the amplitude of input signals. Due to the so-called time walk effect, time determined using leading edge discriminators changes along with the signal amplitude. The effect may be adjusted to a certain degree if the signal charge or amplitude is measured simultaneously. In case of constant fraction discriminators, the time at which the signal exceeds the preset amplitude fraction is generally not dependent on the amplitude, but it may change depending on the shape of the signal (i.e on the temporal distribution of photons). The larger the scintillator, the larger the variations in signal shapes and amplitudes.

Logical signals generated at discriminators are processed by means of sequences of logical operations within a triggering system. These operations result in a logical signal providing information on whether the recorded event should be subjected to further electronic processing. The sequences of logical operations are selected depending on the types of detectors, configuration of modules and the frequencies of recorded events; the main objective of these operations is to discard signals that are not useful for image reconstruction and thus to minimize acquisition dead times as well as times required to process the data and reconstruct the images.

The PCT applications WO2011/008119 and WO2011/008118 describe various aspects of PET scanners that may be of relevance for understanding this description, in particular, a method for determining the position of ionization on the basis of the distribution of times or amplitudes of signals measured at different positions along the scintillator. These documents describe solutions that are based on the measurements of the times of flight required for light pulses to reach detector edges.

A US patent application US2009303096 discloses systems and methods for analog to digital conversion. For example, an analog to digital converter is disclosed that includes an analog input that is provided to a comparator bank. The comparator bank receives a reference indicator, and is operable to provide a current output based at least in part on a comparison of the analog input with a reference threshold corresponding to the reference indicator. The analog to digital converter further includes a range selection filter that is operable to receive the current output and to generate the reference indicator based at least in part on a prior output of the comparator bank.

It would be expedient to develop a method and a device for examination of analog signal parameters that would allow to achieve high accuracy of the measurement of the times of arrival of electric pulses, preferably the accuracy of a several dozens of picoseconds, regardless of the shape and the amplitude of these signals, while being characterized by a markedly lower power consumption compared to discriminators of the state of the art and combining the roles of an analog discriminator and a digital transducer. In addition, the discriminator function would combine both leading edge and constant fraction discriminator functions.

SUMMARY

There is presented a method for measuring parameters of an analog signal to determine times at which the analog signal crosses predetermined voltage thresholds. The method comprises the steps of: splitting the analog signal into a number of interim signals, the number of the interim signals corresponding to the number of the preset voltage thresholds; providing an FPGA system comprising differential buffers with outputs connected to a number of sequences of delay elements, the number of sequences of delay elements corresponding to the number of the preset voltage thresholds; inputting, to an input of each differential buffer, one interim signal and a reference voltage corresponding to a particular preset voltage threshold; reading, by means of vector generators, assigned separately to each of the sequences and connected to a common clock signal, current values of output signals of each of the delay elements in the particular sequence at the same moment for all vector generators and providing these values as sequence output vectors; and determining times at which the analog signal crosses the predetermined voltage thresholds on the basis of the values of the sequence output vectors and the delays introduced by the delay elements.

There is also presented a system for measuring parameters of an analog signal to determine times at which the analog signal crosses predetermined voltage thresholds, the system comprising: a splitter configured to split the analog signal into a number of interim signals, the number of the interim signals corresponding to the number of the preset voltage thresholds; an FPGA system, comprising differential buffers with outputs connected to a number of sequences of delay elements, the number of sequences of delay elements corresponding to the number of the preset voltage thresholds; wherein to the input of each buffer there is connected one interim signal and a reference voltage corresponding to a particular preset voltage threshold; wherein to each of the sequences there are connected vector generators connected to a common clock signal; and wherein the vector generators are configured to read current values of output signals of each of the delay elements in the particular sequence at the same moment for all vector generators and to provide these values as sequence output vectors.

The disclosed multilevel discriminator system allows to precisely measure the time with temporal resolution of the order of ~10 ps. This is achieved mainly by using an FPGA system comprising LVDS buffers (or other differential buffers). An additional feature of the system is the ease of scalability of the number of discriminator channels and the time measurements.

BRIEF DESCRIPTION OF DRAWINGS

Example embodiments are presented on a drawing wherein.

DETAILED DESCRIPTION

The presented solution is based on an FPGA system due to the fact that typical FPGA systems are in a standard way equipped with differential inputs (such as low voltage differential signal (LVDS) buffers) and permit reprogramming of logical connections within the system. The presence of a carry chain facilitating fast communication between neighboring logic cells (chain elements) was also made use of.

Figure 1:
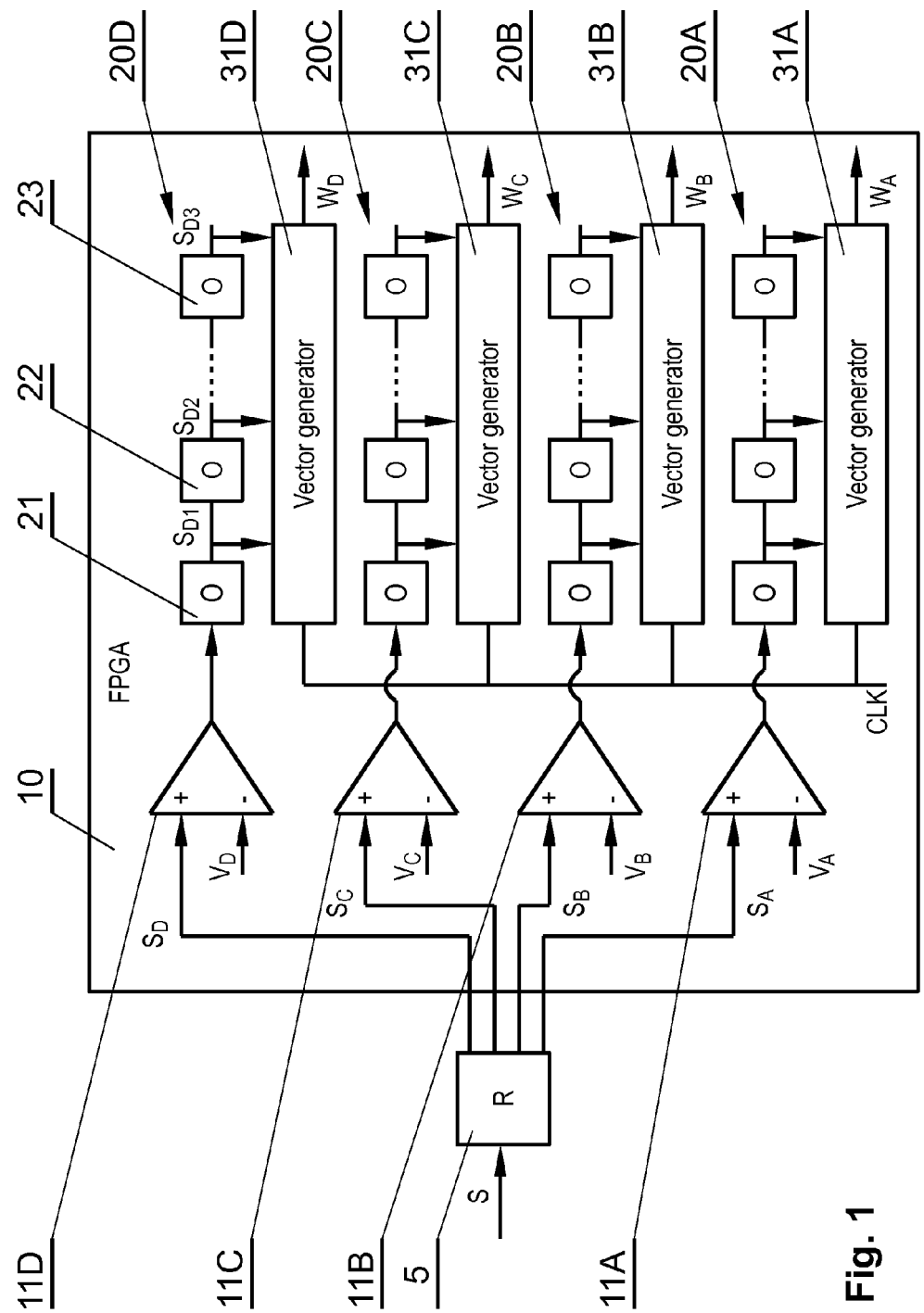
FIG. 1 presents an outline of the system.

The system as presented in FIG. 1 is used for the measurement of analog signal parameters consisting in determination of times at which the analog signal S crosses the preset voltage thresholds. In the presented example embodiment, the system is designed to measure the times at which the signal S crosses four voltage thresholds: $V_A$, $V_B$, $V_C$, $V_D$.

The measured analog signal S is split in splitter 5 into interim signals $S_A$, $S_B$, $S_C$, $S_D$ in a number corresponding to the number of preset thresholds.

Interim signals $S_A$, $S_B$, $S_C$, $S_D$ are delivered to the FPGA system 10 at the inputs of differential buffers, for example LVDS buffers 11A, 11B, 11C, 11D. Reference voltages $V_A$, $V_B$, $V_C$, $V_D$ are delivered to the remaining inputs of each buffer. Buffer outputs are connected to sequences 20A, 20B, 20C, 20D of delay elements 21, 22, 23. The number of delay elements depends on the configuration of a particular system and is preferably not lower than the ratio of the mean duration of the measured pulse and the delay introduced by a single delay element. Carry chains used in a standard way as summator elements in FPGA systems may be used as the sequences of delay elements, with every chain element in the configuration acting as a delay line.

Vector generators 31A, 31B, 31C, 31D are assigned separately to each of the sequences 20A, 20B, 20C, 20D and connected to a common clock signal CLK. Said generators are designed so as to read the current values of the output signals of each delay element 21, 22, 23 in the particular sequence 20A, 20B, 20C, 20D at the same moment for all generators, as illustrated by means of example in FIG. 2. The readout moment may be determined by a particular slope of the clock signal. In the example embodiment illustrated in FIG. 2, the output signal $S_{D2}$ of the delay element 22 is delayed in relation to the output signal $S_{D1}$ by the delay value specific to that delay element, while the output signal $S_{D3}$ of the delay element 23 is delayed in relation to $S_{D2}$ by a multiple of the delay depending on the number of delay elements between elements 22 and 23. When read at the increasing slope of the CLK signal, values of $S_{D1}$ and $S_{D2}$ are equal to 1 and the value of $S_{D3}$ is equal to 0.

Figure 2:
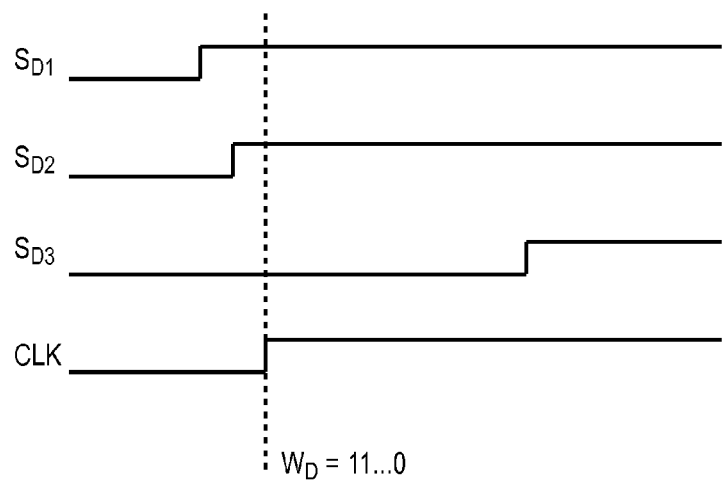
FIG. 2 presents an outline of output vector generation.

Values read at the outputs of individual delay elements 21, 22, 23 are delivered at the generator output as the sequence output vectors $W_A$, $W_B$, $W_C$, $W_D$—in the example presented in FIG. 2, the sequence output vector would have the value of 11 . . . 0 where " . . . " represents values read from the delay elements located between elements 22 and 23.

Knowing the time of occurrence of the increasing slope of the time signal and the delays introduced by individual delay elements, one can calculate the moment at which a particular interim signal is switched with the accuracy equal to the delay introduced by a single delay element.

For instance, if the sequence of delay elements comprises ten elements, the sequence output vector W=1111000000 would imply that the interim signal value is switched from 0 to 1 at the moment corresponding to the moment of measurement minus four times the delay of a single element. Likewise, the sequence output vector W=0001111111 would imply that the interim signal value is switched from 1 to 0 at the moment corresponding to the moment of measurement minus three times the delay of a single element. The value of the delay of a single element is usually much lower than the clock frequency. For instance, in the Lattice ECMP3 FPGA system, the delay introduced by individual elements of the carry chain may be as low as ~10 ps regardless of the operating frequency of the FPGA system.

Figure 3:
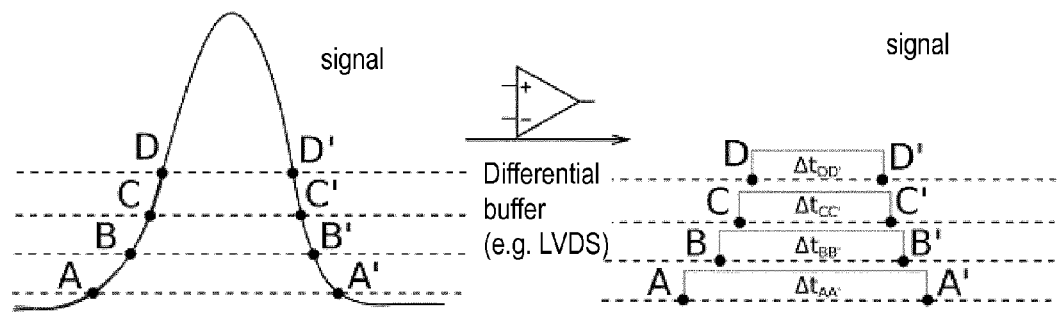
FIG. 3 presents an outline of the process of combining the temporal parameters from interim signals.

Therefore, the system facilitates the measurement of the temporal parameters of each of the interim signals with the accuracy equal to the delay of an individual element. Due to the fact that individual generators are connected to a common clock, the measurements of temporal parameters of the interim signals are perfectly synchronized. It is therefore possible to precisely determine the time course of the entire signal S with the accuracy dependent on the number of preset thresholds and the delay value of a single delay element. An example information being combined from individual threshold values is presented in FIG. 3.

Leading edge or constant fraction discriminators may be designed depending on the preset voltage threshold values and the number of thresholds.

Therefore, the system facilitates very accurate determination of the time courses of pulses generated at converters in TOF-PET scanners.

While the technical solutions presented herein have been depicted, described, and defined with reference to particular preferred embodiment(s), such references and examples of implementation in the foregoing specification do not imply any limitation on the invention. Various modifications and changes may be made thereto without departing from the scope of the technical solutions presented. The presented embodiments are given as example only, and are not exhaustive of the scope of the technical solutions presented herein. Accordingly, the scope of protection is not limited to the preferred embodiments described in the specification, but is only limited by the claims that follow.

The invention claimed is:

1. A method for measuring parameters of an analog signal to determine times at which the analog signal (S) crosses preset voltage thresholds ($V_A$, $V_B$, $V_C$, $V_D$), the method comprising the steps of:
    splitting the analog signal (S) into a number of interim signals ($S_A$, $S_B$, $S_C$, $S_D$), the number of the interim signals corresponding to the number of the preset voltage thresholds ($V_A$, $V_B$, $V_C$, $V_D$);
    providing a Field Programmable Gate Array (FPGA) system comprising differential buffers with outputs connected to a number of sequences of delay elements, wherein each of the sequences of delay elements contains a plurality of delay elements, the number of sequences of delay elements corresponding to the number of the preset voltage thresholds;
    inputting, to an input of each differential buffer, one interim signal ($S_A$, $S_B$, $S_C$, $S_S$) and a reference voltage corresponding to a particular preset voltage threshold ($V_A$, $V_B$, $V_C$, $V_D$);
    reading, by means of vector generators, assigned separately to each of the sequences and connected to a common clock signal (CLK), current values of output signals of each of the plurality of the delay elements in the particular sequence at the same moment for all vector generators and providing these values as sequence output vectors ($W_A$, $W_B$, $W_C$, $W_D$), each of the sequence output vectors comprising a sequence of values read at the individual outputs of each of the plurality of the delay elements; and
    for each of the sequences of delay elements, determining a time at which the analog signal (S) crosses the preset voltage threshold on the basis of the values of the sequence output vector for that sequence of delay elements and the delays introduced by each of the plurality of the delay elements of that sequence of delay elements.

2. The method according to claim 1, wherein each of the sequences of delay elements comprises a carry chain of FPGA summator elements.

3. The method according to claim 1, wherein the differential buffers are low voltage differential signal (LVDS) buffers of the FPGA system.

4. A system for measuring parameters of an analog signal to determine times at which the analog signal (S) crosses preset voltage thresholds ($V_A$, $V_B$, $V_C$, $V_D$), the system comprising:
    a splitter configured to split the analog signal (S) into a number of interim signals ($S_A$, $S_B$, $S_C$, $S_D$), the number of the interim signals corresponding to the number of the preset voltage thresholds ($V_A$, $V_B$, $V_C$, $V_D$);
    a Field Programmable Gate Array (FPGA) system, comprising differential buffers with outputs connected to a number of sequences of delay elements, wherein each of the sequences of delay elements contains a plurality of delay elements, the number of sequences of delay elements corresponding to the number of the preset voltage thresholds ($V_A$, $V_B$, $V_C$, $V_D$);
    wherein to the input of each buffer there is connected one interim signal ($S_A$, $S_B$, $S_C$, $S_D$) and a reference voltage corresponding to a particular preset voltage threshold ($V_A$, $V_B$, $V_C$, $V_D$);
    wherein to each of the sequences there are connected vector generators connected to a common clock signal (CLK); and
    wherein each of the vector generators is configured to read current values of output signals of each of the plurality of the delay elements in the particular sequence at the same moment for all vector generators and to provide these values as a sequence output vector ($W_A$, $W_B$, $W_C$, $W_D$), wherein the sequence output vector comprises a sequence of values read at the individual outputs of each of the plurality of the delay elements.

5. The system according to claim 4, wherein each of the sequences of delay elements comprises a carry chain of FPGA summator elements.

6. The system according to claim 4, wherein the differential buffers are low voltage differential signal (LVDS) buffers of the FPGA system.

* * * * *